United States Patent [19]

LeBoeuf et al.

[11] Patent Number: 5,194,030

[45] Date of Patent: Mar. 16, 1993

[54] TOY VEGETABLE DOLL AND SEEDS

[76] Inventors: Raymond T. LeBoeuf; Paula A. LeBoeuf, both of 1090 Mineral Spring Ave., North Providence, R.I. 02904

[21] Appl. No.: 867,334

[22] Filed: Apr. 13, 1992

[51] Int. Cl.$^5$ .............................................. A63H 3/00
[52] U.S. Cl. ...................................... 446/72; 446/268; 434/433
[58] Field of Search ...................... 446/71–75, 446/268, 491, 385; 434/433, 393

[56] References Cited

U.S. PATENT DOCUMENTS

| 3,471,964 | 10/1969 | Cherry et al. | 446/268 |
| 4,795,398 | 1/1989 | Wexler | 446/327 |
| 4,950,194 | 8/1990 | Gullace | 446/72 |
| 4,964,831 | 10/1990 | Wolff | 446/75 |

Primary Examiner—Mickey Yu
Attorney, Agent, or Firm—Salter, Michaelson & Benson

[57] ABSTRACT

A toy doll having a body portion in the shape of a vegetable is imbedded in a simulated flower pot packed with an artificial potting soil. The doll is formed from a resilient foam, and has arms and legs extending from the body, and fanciful hair extending upwardly therefrom. A package of seeds for growing the vegetable characterized by the doll is releasably attached to one of the hands of the doll. The doll is imbedded in the flower pot such that the fanciful hair projects upwardly above the artificial potting soil. The package of seeds becomes available for planting when a child grasps the exposed hair and removes the doll from the flower pot by pulling upwardly.

9 Claims, 1 Drawing Sheet

TOY VEGETABLE DOLL AND SEEDS

BACKGROUND AND SUMMARY OF THE INVENTION

The instant invention relates to toys and more particularly relates to an educational toy for teaching children about vegetables.

It has been found that environmental issues are increasingly becoming a regular part of everyday life and the need to teach children about the environment is thus becoming more important. One aspect of teaching children about the environment is teaching the importance of plants and how plants grow. In particular, it is important that children learn how common agricultural food products, such as vegetables, are grown. In general, it has been found that dolls are often very effective tools for teaching children. Heretofore, various dolls in the form of vegetables have been available for amusement and in this regard, Hasbro's "Mr. Potato Head ®" is a good example. Although these types of vegetable dolls are amusing, they offer relatively little educational value. It has thus been determined that there is a need for new educational toys which focus on the topic of growing vegetables.

The instant invention provides an educational toy for teaching children about growing vegetables while at the same time providing considerable amusement and enjoyment to the children. Briefly, the toy comprises a simulated flower pot which is packed with an artificial potting soil, such as vermiculite, and a toy doll having a body portion in the shape of a vegetable. The toy doll is fashioned from a resilient foam material, and includes arms and legs extending outwardly from the body portion, and fanciful hair extending upwardly from a head portion of the doll. The doll is imbedded in the flower pot such that the arms and legs are folded inwardly against the body portion, and the fanciful hair extends above the surface of the artificial dirt. A package of seeds for growing the vegetable characterized by the doll is attached to one of the arms of the doll. The doll is removed from the flower pot by grasping the exposed hair and pulling upwardly, whereby the arms and legs spring outwardly to an extended position, and the package of seeds becomes available for use by a child. The child and a supervising parent can thereafter plant the seeds and watch the particular type of vegetable grow to maturity.

Accordingly, it is an object of the instant invention to provide an educational toy for teaching children about vegetables and how they are grown.

It is another object to provide an amusing toy doll which is formed in the shape of a vegetable.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
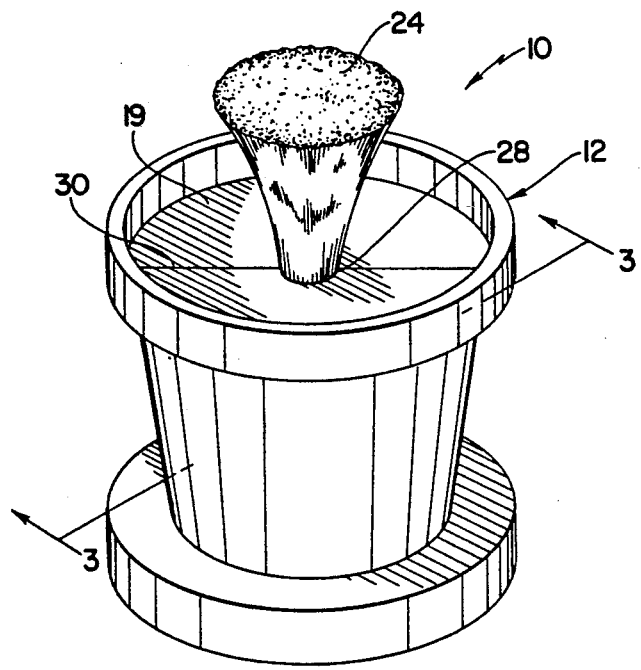
FIG. 1 is a perspective view of the educational toy of the instant invention.
Figure 2:
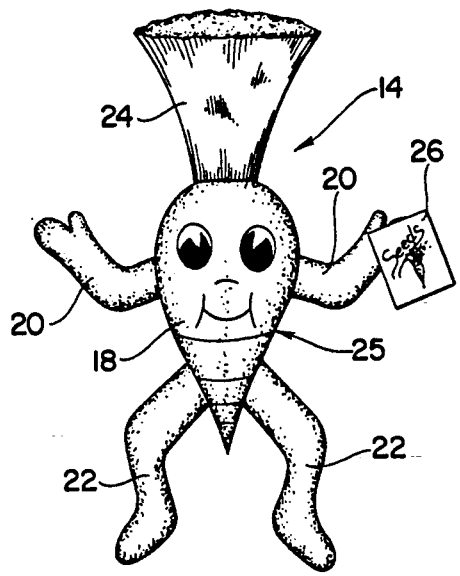
FIG. 2 is a front elevational view of the toy vegetable doll of the instant invention.
Figure 3:
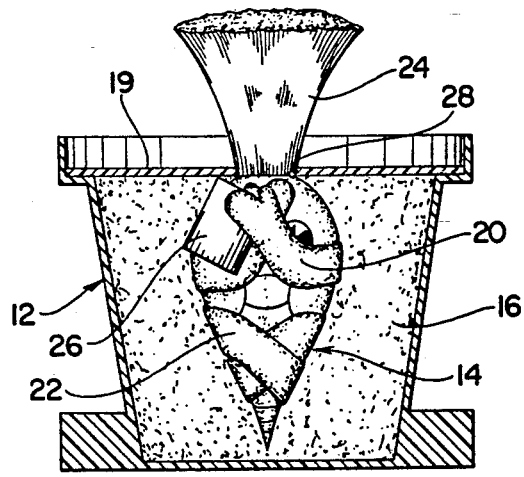
FIG. 3 is a cross sectional view taken along line 3—3 of FIG. 1.

Referring now to the drawings, and particularly to FIGS. 1 and 2, the educational toy of the instant invention is illustrated and is generally indicated at 10 in FIG. 1. The toy 10 comprises a simulated flower pot generally indicated at 12 (FIG. 1), and a toy doll generally indicated at 14 (FIG. 2) which in the form illustrated has the shape of a carrot. The flower pot 12 is preferably fashioned from a suitable plastic material, and it is packed with an artificial potting soil 16 (FIG. 3). The artificial potting soil 16 preferably comprises a granulated foam, such as a gypsum-type vermiculite, however, other artificial soil materials can also be utilized effectively without adversely affecting the invention. A thin, transparent, plastic film 19 extends over the surface of the vermiculite 16 to prevent spillage thereof during shipment and display of the toy. The toy vegetable doll 14 is preferably molded from a resilient foam material, and it comprises a body portion 18 in the shape of a carrot, arms 20, legs 22 extending outwardly therefrom, and fanciful hair 24 extending upwardly from a top portion of the body 18. The body portion 18 further includes amusing facial features generally indicated at 25 which are appropriately positioned thereon. The facial features 25 increase the play value of the toy doll 14 as part of the educational toy 10, and also as an independent toy. The educational toy 10 further comprises a package of carrot seeds 26 for growing the carrots characterized by the doll 14. The package 26 is attached to one of the arms 20 of the doll 12 by any suitable means. Although the instant embodiment of the doll 14 is illustrated in the form of a carrot, the scope of the invention is intended to cover all species of vegetables, such as onions, beets, turnips, etc.

Referring now to FIG. 3, the doll 14 is imbedded in the flower pot 12 such that the arm 20 and legs 22 thereof are folded inwardly against the body portion 18, and the hair 24 is exposed above the vermiculite 16. The hair 24 extends upwardly through an aperture 28 in center of the plastic film 19 whereby the hair 24 simulates the sprouts of a carrot growing in the pot 12. The flower pot "soil" hides the identity of the vegetable and creates anticipation of the contents for any child who might purchase the toy. The doll 14 is removed from the pot 1 by grasping the hair 24 and pulling upwardly to forcibly extricate the doll from the "soil", at which point the arms 20 and legs 22 spring outwardly to the extended position shown in FIG. 2 due to the resiliency of the foam material of which the doll is molded, it being understood that the doll is molded in the position illustrated in FIG. 2. The plastic film 19 includes a slit 30 extending diametrically across the flower pot 12 for easier removal of the doll 14 from the flower pot 12. When the doll 14 is removed, the identity of the vegetable is revealed, and the package of seeds 26, which is releasably secured to one of the doll's hands by any suitable adhesive means, is presented to the child for planting. Thereafter, the child and a supervising adult may plant the seeds and watch the vegetable grow to maturity. The child effectively learns about vegetables by watching the progressive growth of the vegetable, and at the same time, the toy 10 and doll 14 has substantial play value.

It can therefore be seen that the instant invention provides an effective educational toy for teaching children about growing vegetables. The toy vegetable dolls are amusing, and the anticipation created by hiding the doll within a simulated flower pot increases the play value of the toy. The child effectively learns how vegetables grow by observing the actual plants as they grow to maturity. For these reasons it is believed that the educational toy of the instant invention represents significant advancements in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An educational toy comprising:
   a simulated flower pot packed with a granular material simulating potting soil;
   a toy doll comprising a body portion in the shape of a vegetable, said doll being substantially embedded in said granular material such that the identity of said vegetable is hidden;
   an exposed portion of said doll extending above the top surface of said granular material; and
   a package of vegetable seeds for growing the vegetable characterized by said doll, said package being releasably secured to said doll body portion, said doll being removable from said flower pot by grasping said exposed portion and pulling upwardly, whereby said doll is extricated from said simulated soil, and said seeds become available for planting.

2. In the toy of claim 1, said exposed portion comprising simulated hair projecting upwardly from said body portion.

3. In the toy of claim 1, said body portion having arms and legs connected thereto and movable between a first position wherein they extend outwardly from said body portion, and a second position wherein they are folded inwardly against said body portion, means normally biasing said arms and legs to said first position, said arms and legs being in said second position when the doll is embedded in said artificial soil.

4. In the toy of claim 3, said seed package being releasably secured to one of said arms adjacent to the end thereof, so as to make it appear that said doll is handing off said seed package.

5. In the educational toy of claim 1, said artificial potting soil comprising vermiculite.

6. In the educational toy of claim 3, said toy doll comprising a resilient foam.

7. In the educational toy of claim 3, said arms and legs springing outwardly to their extended position when said doll is removed from said flower pot.

8. The educational toy of claim 1, further comprising a thin plastic film extending over said artificial potting soil, said exposed portion of said doll extending upwardly through an aperture in said film.

9. In the educational toy of claim 8, said plastic film being transparent, and having a diametrical slit extending thereacross.

* * * * *